Patented Apr. 2, 1940

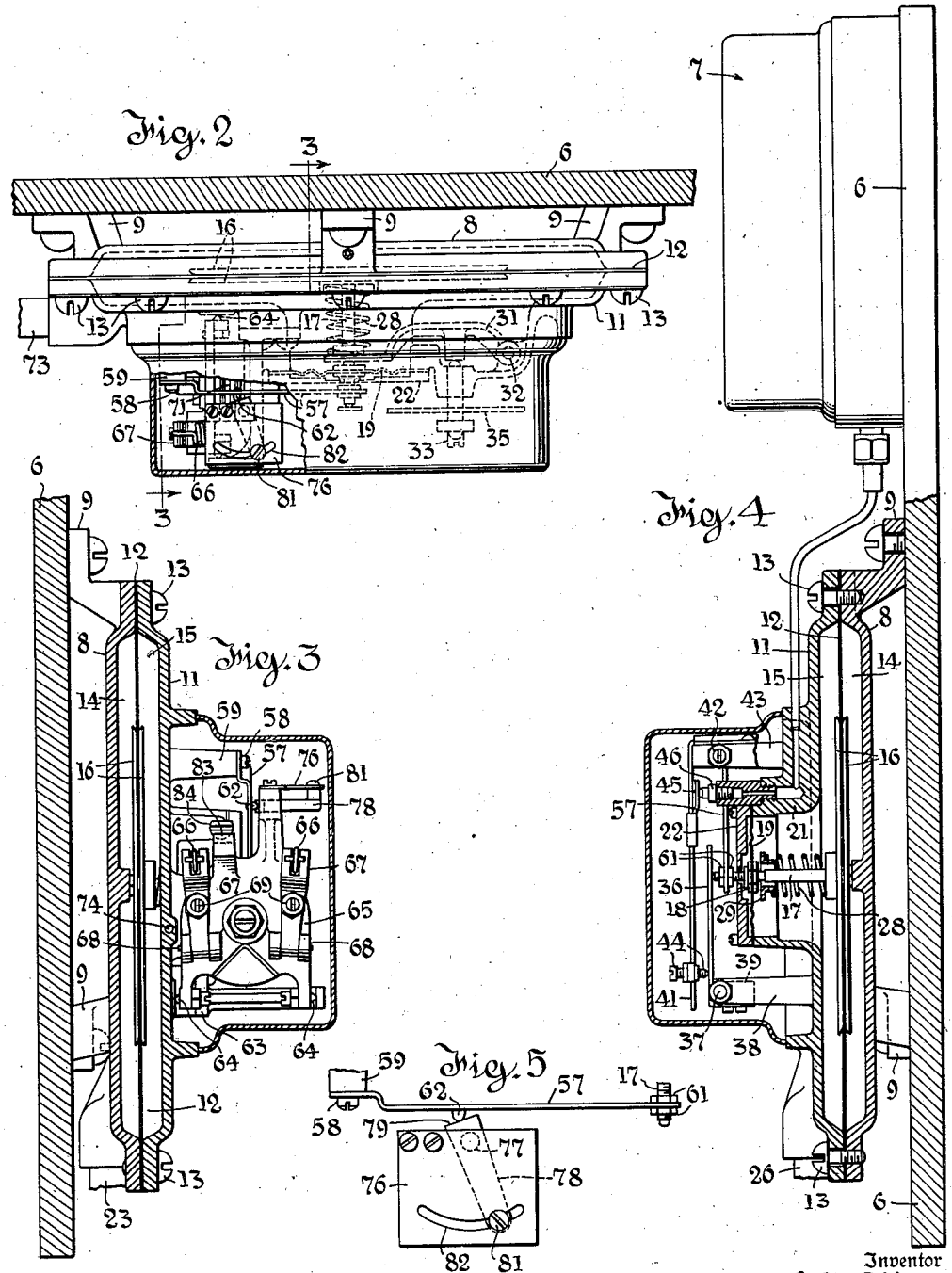

2,195,520

UNITED STATES PATENT OFFICE 2,195,520

PRESSURE CONTROL

Carl A. Otto, Milwaukee, Wis., assignor to Johnson Service Company, Milwaukee, Wis., a corporation of Wisconsin Application June 7, 1939, Serial No. 277,963

7 Claims. (Cl. 137—153)

This invention relates to pressure regulators intended to respond to static pressure in an air distributing duct and act through suitable regulatory means to maintain such pressure constant.

In ventilating and air conditioning systems, whether they are of the heating or cooling type or of the convertible type, it is often necessary to use local controls which restrict certain outlets quite independently of the restriction of other outlets in the same system. In consequence, variable back pressures are developed in the ducts and in the absence of compensatory regulation the effect is to disturb the distribution and to an extent to defeat the regulatory action of those controls which are supposed to regulate temperature or humidity, or both, in the conditioned space.

The present invention produces an extremely sensitive device which not only responds to pressure in the duct but responds to the differential between that pressure and atmospheric pressure. The device is so sensitive that it will respond to pressure variations of the order of 0.01 inch of water and within a very small pressure range serves to operate a controlled mechanism such as a damper motor throughout its entire range. The invention offers simple means for adjusting or zeroing the control point of the instrument and also provides means for readjusting and changing this control point by graduated amounts from a remote point. The amount of the change so effected is also capable of ready adjustment at the instrument.

A commercial embodiment of the invention will now be described with reference to the accompanying drawings in which Figure 1 is a front elevation of the complete device with the cover removed to disclose the internal construction, the instrument being shown diagrammatically connected in a control system to which it is suited.

Figure 2 is a plan view of the control instrument shown in Figure 1 with the cover in place and partly broken away to illustrate the internal construction.

Figure 3 is a section on line 3—3 of Figure 2 looking to the right with reference to that figure.

Figure 4 is a section on the line 4—4 of Figure 1 looking to the left with reference to that figure.

Figure 5 is a fragmentary view illustrating how the re-adjusting mechanism may be set variably, to modify the degree of re-adjustment.

Figure 1:
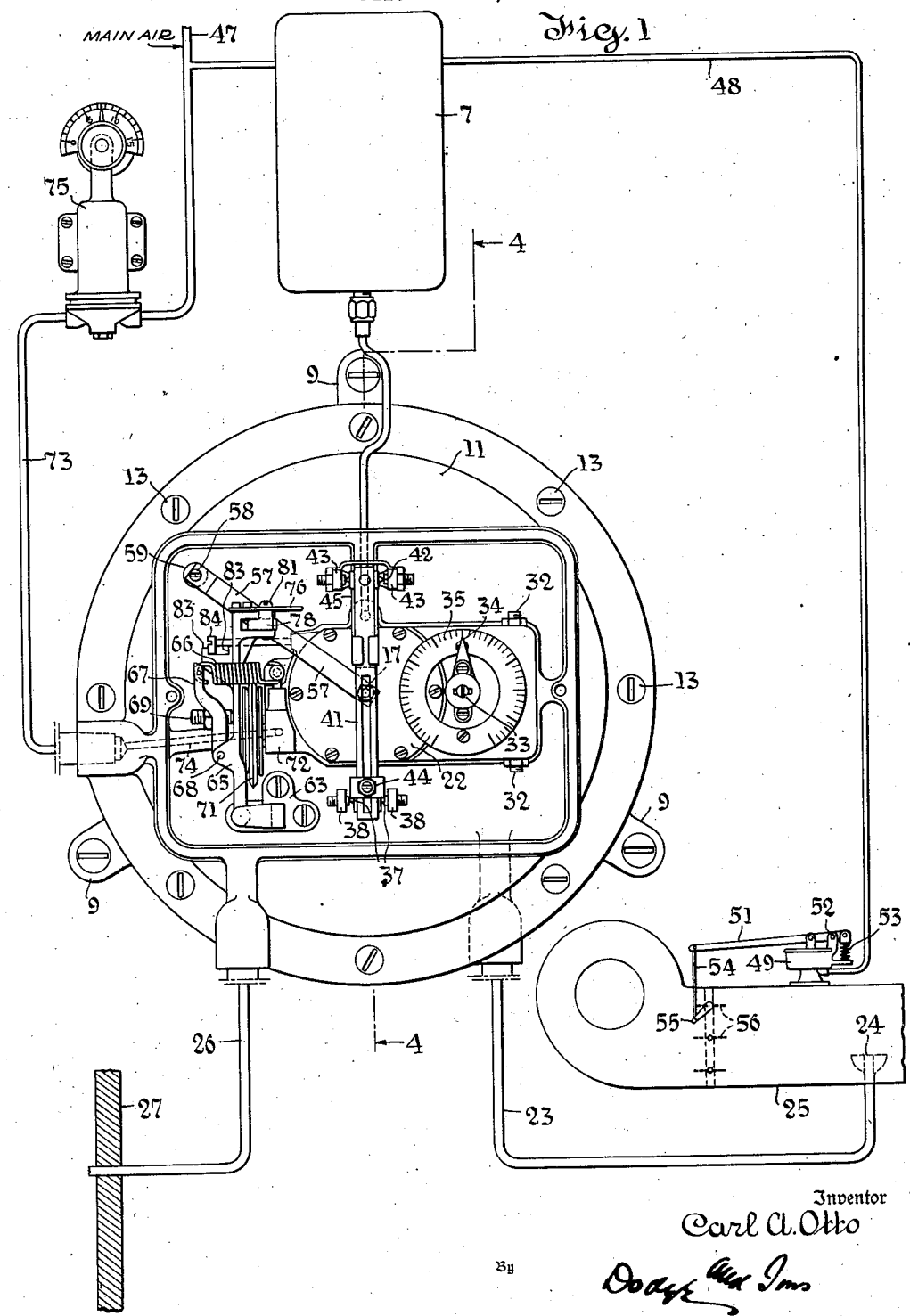

A panel on which the control mechanism is mounted is shown at 6, and 7 indicates an intermediate reverse acting pneumatic relay of the type described and claimed in the patent to Otto, No. 1,726,409, August 27, 1929. This is mounted on the panel 6, immediately above the control instrument forming the subject matter of the present application.

A base casting 8 of generally circular form with mounting lugs 9 and a mating cap casting 11 receive between them a sensitive flexible diaphragm 12. The two castings are connected by a plurality of screws 13 and the periphery of the diaphragm is sealed tightly by the marginal portions of the two castings. In this way two isolated chambers 14, 15, are provided. Clamped through the center of the diaphragm 12 are stiffener plates 16 16 which are flared at their edges as shown.

Attached to the plates 16 is a stem 17 which projects forward and is clamped by nuts 18 to the center of a small circularly corrugated diaphragm 19. The diaphragm 19 is sealed between a flange 20 21 on the casting 11 and a cap plate 22 which is attached by screws to that flange. The diaphragm 19 is of negligible area as compared to the diaphragm 12 and serves merely as a packless gland serving to seal the chamber 15.

The chamber 14 to the rear of the diaphragm 11 is connected by a tube 23 and orifice 24 to the interior of a duct 25 in which duct the pressure is to be sensed by the instrument. The chamber 15 forward of the diaphragm 12 is maintained at atmospheric pressure and to avoid any disturbing pressure effects which might exist within the building, the chamber 15 is connected by the tube 26 to a point outside the building. To bring about this result, the tube leads through the outside wall conventionally indicated at 27.

The orifice 24 is so located that it is subject to static pressure in the duct and is not affected by velocity of air flow in the duct. To secure this result the orifice 24 is in a plane face parallel with the path of flow. Thus, the diaphragm responds to the pressure differential between the interior of the duct and the outside atmosphere which, as is well-known, is a variable pressure. According to the embodiment here described the duct 25 is at a pressure which is always higher than atmospheric. Consequently, the diaphragm is loaded in opposition to duct pressure, that is, urged to the right as viewed in Figure 4, by a coiled compression spring 28 which reacts between one of the plates 16 and a spring seat 29.

As best shown in Figure 2, the spring seat 29 is carried by the end of a lever 31 which is pivoted on pivot screws 32 within an enlargement of chamber 15 formed in casting 11 to the right of flange 21. The position of the lever is adjusted by a thrust screw 33 threaded through the front wall of the enlargement just mentioned. A pointer 34 indicates the adjustment on a graduated dial 35, the dial being mounted on the front wall of the enlargement concentrically with screw 33.

The end of the stem 17 reacts in thrust with an approximately vertical lever 36 which is pivoted at 37 to the brackets 38 and which is urged to swing in a clockwise direction as viewed in Figure 4 by a small weight 39. In this way, the lever is kept in contact with the stem without exerting any material thrust upon that stem. Such thrust as is exerted is virtually constant.

Lever 36 is in thrust engagement with a pendant lever 41 which is pivoted at 42 on a bracket 43. The lever 41 is urged by gravity to swing in a counter-clockwise direction and since the two levers 36 and 41 are reversely arranged, the thrust member 44 which is longitudinally adjustable on the lever 41 affords a variable ratio drive connection between the two levers.

The adjustable thrust member 44 is frictionally clamped upon the lever 41 and may be slid up and down between the limits imposed by the length of the lever 36. The lever 41 carries a pad or valve element 45 which coacts with a leak-port 46 to control the relay 7. The leak-port 46 corresponds to and is functionally identical with the leak-port 57 in the Otto Patent No. 1,726,409. In so far as is material to the present invention, its functions are as follows:

Supply air line 47 delivers air to the relay 7 under pressure of (say) fifteen pounds gauge, that being the standard pressure in this art. The branch line 48 leading from the relay is subject to pressure control by the relay in such manner that when the leak-port 46 is wide open, the pressure in the branch line 48 equals the pressure in the supply line 47, in this case, fifteen pounds gauge. Conversely, when the leak-port 46 is sealed by the valve 45, the pressure in the branch line 48 is zero pounds, that is, the line is at atmospheric pressure. The branch line 48 leads to a damper motor 49 which is a bellows motor connected to turn the lever 51 clockwise about its pivot 52 in response to rising pressure in the pipe 48. Such motion is resisted by a return spring 53. The lever 52 is connected by a link 54 and crank 55 with a multiple louvered damper 56 of conventional form, so that rising branch line pressure causes the damper to move in a closing direction.

The parts are so arranged that as pressure in the duct 25 rises, the diaphragm 12 will be moved to the left tending to open the leak-port 46. The opening of the leak-port 46 causes (through the action of the relay 7) an increase of pressure in the branch line 48. This causes the lever 51 to turn clockwise thus closing the damper 56. The action is gradual because the motion of the diaphragm 12 is gradual, the relay 7 is of the gradual or progressively acting type and the damper motor moves proportionally to pressure in the branch line 48.

The normal control point of the instrument is adjusted by turning the screw 33 to vary the stress on the spring 28. The adjustment is indicated on the dial 35.

In the operation of devices of this type, it is desirable to change from time to time, and to a controllable extent, the control point of the instrument. To bring about this result, a secondary loading spring is used and this takes the form of a normally unstressed leaf spring 57 which is rigidly connected at 58 to a bracket 59. Its other end is clamped between the nuts 61 on the outer end of the stem 17.

To render the spring 57 effective, it is stressed by exerting thrust upon the boss 62. To exert such stress, use is made of a pressure motor mechanism which will now be described.

A bracket 63 mounted on the casting 11 affords pivot bearings 64 for plate-like lever 65. This lever, as viewed in Figure 1 is swung clockwise by two coil tension springs 66. The springs are not connected directly to the lever 65 but are connected to the ends of secondary levers 67 which are pivoted at 68 to lever 65 and are adjustable relatively thereto by turning thrust screws 69. The lever 65 may be forced counter-clockwise by a metal cell diaphragm 71, which is mounted on a boss 72 and which bears at its left-hand face on the lever 65. A loading line 73 is connected by a port 74 to the interior of the diaphragm 71.

Pressure in line 73 is controlled by a gradual switch 75 which is simply a manually adjustable pressure reducing valve supplied with air by line 47.

When the diaphragm 71 is under pressure, lever 65 swings counter-clockwise. It carries at its upper end plate 76. Pivoted at 77 to the plate 76 is a lever 78 having a straight cam nose 79 in position to coact with the boss 62. The angularity of the cam nose 79 may be adjusted by shifting the clamp screw 81 in the arcuate slot 82 and then setting the screw up to maintain the adjustment. The motion of the lever 65 is fixed by engagement of stops 83 with the head of the screw 84. Thus, the range in motion of the lever 65 is fixed. The extent of adjustment of the spring 67 effected by the full range of motion of lever 65 is determined by changing the obliquity of the cam face 79.

The adjustment mechanism just described, can be used for various purposes. The adjustment is progressive. Lever 65 starts to move at one pound pressures in line 73 and completes its motion at fifteen pounds.

While one embodiment of the invention has been described in considerable detail, the description is intended to be illustrative and not limiting.

The scope of the invention will be defined in the claims.

What is claimed is:

1. Means for actuating a leak controlling valve according to variations in a controlling pressure which comprises, a diaphragm; means for subjecting said diaphragm on opposite sides to said controlling pressure and to atmospheric pressure; a leak controlling valve; an actuating connection between said diaphragm and valve; yielding means for loading said diaphragm; means local to the instrument for adjusting said loading means; a pressure motor arranged to develop a load modifying force; and pressure controlling means operable at a point remote from said instrument to vary the pressure in said motor means.

2. Means for actuating a leak controlling valve according to variations in a controlling pressure which comprises, a diaphragm; means for subjecting said diaphragm on opposite sides to said controlling pressure and to atmospheric pressure; a leak controlling valve; an actuating connection between said diaphragm and valve; ratio changing means associated with said connection to vary the motion ratio of the diaphragm and valve; yielding means for loading said diaphragm; means local to the instrument for adjusting said loading means; a pressure motor arranged to develop a load modifying force; and pressure controlling means operable at a point remote from said instrument to vary the pressure in said motor means.

3. Means for actuating a leak controlling valve according to variations in a controlling pressure which comprises, a diaphragm; means for subjecting said diaphragm on opposite sides to said controlling pressure and to atmospheric pressure; a leak controlling valve; an actuating connection between said diaphragm and valve; yielding means for loading said diaphragm; means local to the instrument for adjusting said loading means; a pressure motor arranged to develop a load modifying force; pressure controlling means operable at a point remote from said instrument to vary the pressure in said motor means; and means local to the instrument for varying the ratio between the pressure in said motor and the load modifying force developed thereby.

4. Means for actuating a leak controlling valve according to variations in a controlling pressure which comprises, a diaphragm; means for subjecting said diaphragm on opposite sides to said controlling pressure and to atmospheric pressure; a leak controlling valve; an actuating connection between said diaphragm and valve; ratio changing means associated with said connection to vary the motion ratio of the diaphragm and valve; yielding means for loading said diaphragm; means local to the instrument for adjusting said loading means; a pressure motor arranged to develop a load modifying force; pressure controlling means operable at a point remote from said instrument to vary the pressure in said motor means; and means local to the instrument for varying the ratio between the pressure in said motor and the load modifying force developed thereby.

5. Means for actuating a leak controlling valve according to variations in the pressure differential between two fluid pressures which comprises, a flexible diaphragm; means for subjecting said diaphragm on opposite sides to respective fluid pressures; a leak controlling valve; a variable ratio actuating connection between said diaphragm and valve; a primary loading spring reacting against said diaphragm; means local to the instrument for adjusting the stress on said spring; a secondary loading spring; a pressure motor for developing stress on said secondary loading spring; and pressure controlling means operable from a remote point and serving to vary the pressure in said motor.

6. Means for actuating a leak controlling valve according to variations in the pressure differential between two fluid pressures which comprises, a flexible diaphragm; means for subjecting said diaphragm on opposite sides to respective fluid pressures; a leak controlling valve; a variable ratio actuating connection between said diaphragm and valve; a primary loading spring reacting against said diaphragm; means local to the instrument for adjusting the stress on said spring; a secondary loading spring; a pressure motor for developing stress on said secondary loading spring; pressure controlling means operable from a remote point and serving to vary the pressure in said motor; and means local to the instrument for varying the ratio between the pressure in said motor and the stress developed by the motor on said secondary loading spring.

7. The combination defined in claim 6 in which the secondary loading spring is a leaf spring supported at one end and connected at its other end with said diaphragm and the pressure motor means operates to deflect said leaf spring at a point intermediate its ends.

CARL A. OTTO.